(12) United States Patent
Hunsaker

(10) Patent No.: US 11,009,062 B2
(45) Date of Patent: May 18, 2021

(54) PIVOTING DRIVE SOCKET

(71) Applicant: Steven A. Hunsaker, Gibson City, IL (US)

(72) Inventor: Steven A. Hunsaker, Gibson City, IL (US)

( * ) Notice: Subject to any disclaimer, the term of this patent is extended or adjusted under 35 U.S.C. 154(b) by 84 days.

(21) Appl. No.: 16/221,202

(22) Filed: Dec. 14, 2018

(65) Prior Publication Data

US 2019/0186531 A1  Jun. 20, 2019

Related U.S. Application Data

(60) Provisional application No. 62/599,152, filed on Dec. 15, 2017.

(51) Int. Cl.
| | |
|---|---|
| *F16C 11/04* | (2006.01) |
| *B62D 53/06* | (2006.01) |
| *B60S 9/04* | (2006.01) |

(52) U.S. Cl.
CPC ............ *F16C 11/045* (2013.01); *B62D 53/06* (2013.01); *B60S 9/04* (2013.01); *B60Y 2200/147* (2013.01); *F16C 2326/01* (2013.01)

(58) Field of Classification Search
CPC ...... B60S 9/00; B60S 9/02; B60S 9/08; B60S 9/12; F16C 11/045

USPC .......................................................... 254/419
See application file for complete search history.

(56) References Cited

U.S. PATENT DOCUMENTS

| | | | | |
|---|---|---|---|---|
| 7,311,332 | B2 * | 12/2007 | Baxter ...................... | B60S 9/08 254/419 |
| 8,590,417 | B1 * | 11/2013 | Bono ...................... | G05G 1/085 254/419 |
| 2008/0164683 | A1 * | 7/2008 | VanDenberg ............. | B60S 9/08 280/766.1 |

\* cited by examiner

*Primary Examiner* — Monica S Carter
*Assistant Examiner* — Alberto Saenz
(74) *Attorney, Agent, or Firm* — Charles McCloskey

(57) ABSTRACT

A pivoting drive socket has a cylindrical body within a sleeve, studs on the sleeve, the studs fitting into a slotted bracket, and the bracket joining to a handle. The slot has an elongated, rectangular shape. The body rotates within the sleeve and has a tab upon one end that receives an external tool. The tab has a shape with at least two flat portions. The bracket permits the handle to engage the tab. The bracket has an opening reinforced by a ring that admits the tab for connection into that handle. The tab has at least two chamfers that grip the bracket during usage. The tab rotates the body which engages a pipe that fits upon a mechanism to raise and to lower trailer legs. The invention allows a trucker to use manual effort or to use power to raise or to lower trailer legs.

6 Claims, 3 Drawing Sheets

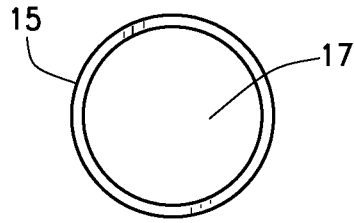
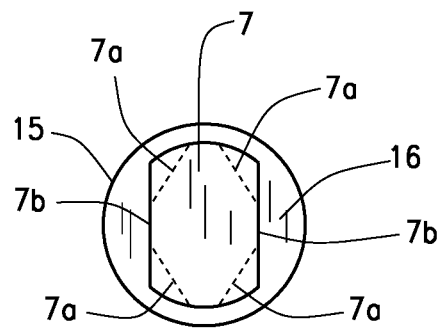
FIG.8  FIG.9
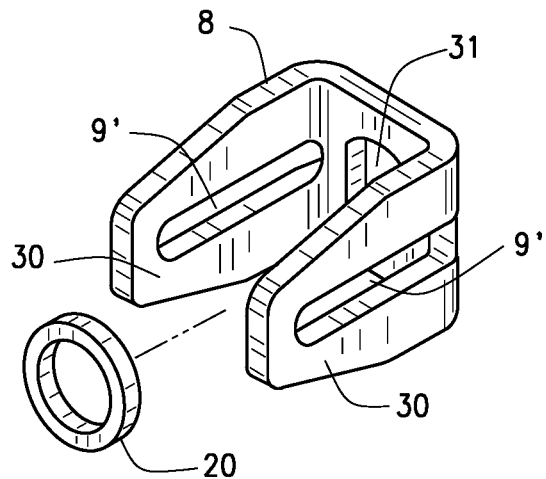
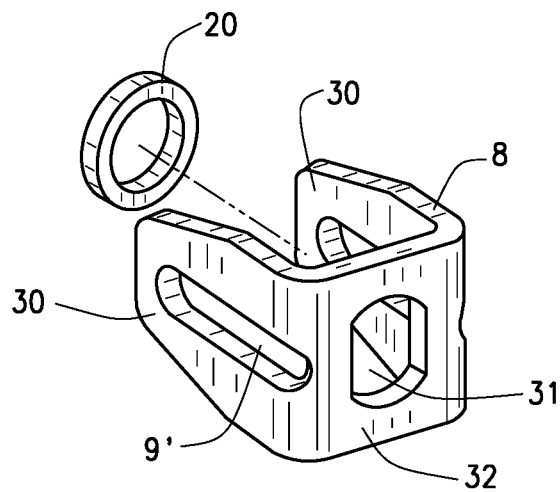
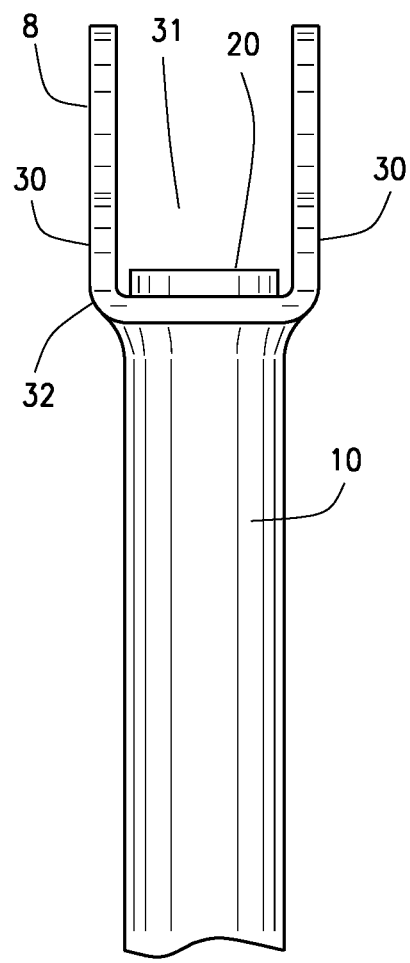
FIG.10  FIG.11  FIG.12

US 11,009,062 B2

PIVOTING DRIVE SOCKET

CROSS-REFERENCE TO RELATED APPLICATION

This non-provisional application claims priority to provisional application No. 62/599,152 filed on Dec. 15, 2017, all of which are owned by the same inventor.

BACKGROUND OF THE INVENTION

The present invention relates generally to towed trailers and more particularly to a tool that extends and retracts the leg of a trailer, generally ahead of the wheels towards the tongue.

Long ago, people used beasts of burden to carry cargo. The cargo would rest in a saddle upon a beast or a traveler would tie the cargo to the beast. A beast of burden such as a donkey, mule, ox, or horse may only carry so much cargo. In time, the cargoes acquired weight that exceed that of a beast to carry himself. People then developed wagons that a beast or a team of beasts of burden would pull. The beasts pulled wagons depending upon the terrain to travel. Donkeys and mules performed well on steep narrow trails in mountains and similar passages in mines. Oxen and horses performed well with cargo on flat land and in river crossings. Oxen and horses often pulled heavy cargo on their wagons. The terrain though still had its effects on cargo. Steep terrain would urge cargo to slide off a wagon. Also, the beasts of burden effected cargo as a startled beast could upset a wagon. Thus, teamsters and other masters of beasts of burden tied cargo securely to wagons. Such ties were generally ropes and with better metal work, they became chains.

Once more, technology moved along. In time, beasts of burden became replaced by engine powered trucks. Trucks come in a wide variety with vans, flat beds, dump, tanker, special purpose, and the like. Similar to wagons of old, a trucker often operates a tractor with a connected flat bed trailer, side dump trailer, dump trailer, tank trailer and the like. Each of these trailers does not move itself. Each of these trailers has wheels upon axles near one end and retractable feet upon the opposite end. The end near the retractable feet connects to the tractor often at the so called fifth wheel. During the connections, the retractable feet are in an up position, that is, away from the supporting road surface. Just prior to connecting to a fifth wheel, just after disconnecting to a fifth wheel, and well after disconnecting to a fifth wheel, a trailer often has its retractable feet in a down position, that is, in contact with a supporting surface, such as a road. This position assists a trucker in connecting and disconnecting the trailer and supports the trailer upright when the tractor has departed from the trailer. Presently, a trucker manually raises and lowers the feet of the trailer.

DESCRIPTION OF THE PRIOR ART

Truckers often use the original equipment upon the trailer to manage the elevation of the feet. That equipment includes a handle fixed to a mechanism upon the feet. The handle has a hinged, universal joint connection to the mechanism so that the handle may fold out of the way when not in use. The handle folds generally parallel to the length of the trailer. A trucker unfolds the handle and extends it outwardly, generally perpendicular to the length of the trailer. The trucker then manually rotates the handle clockwise or counterclockwise as needed to raise or to lower the feet relative to the supporting surface.

However, the handle remains connected to the mechanism. Errant truckers sometimes forget the handle and it flops around during movement of the trailer. The handle also prevents powered turning of the mechanism and the raising and lowering of the feet.

Select mechanisms include fittings, sockets, or adapters to receive power from an outside source. Truckers or mechanic may have air powered tools such as wrenches that engage a fitting upon the mechanism. The trucker then engages the tool which imparts a rotational force to the fitting and thus a quick, powered rotation to the mechanism with follow on prompt raising and lower of the feet.

But, these mechanism with power receptive fittings require a separate power source and lack a handle. The lack of a handle may prevent an errant trucker from raising or lowering the feet thus delaying a load.

SUMMARY OF THE INVENTION

The pivoting drive socket has a cylindrical body within a sleeve, studs on the sleeve, the studs fitting into a slotted bracket, and the bracket joining to a handle. The body rotates within the sleeve and has a tab upon one end that receives an external tool. The bracket permits the handle to also engage the tab in the absence of a power tool. The tab rotates the body which engages a pipe that fits upon a mechanism to raise and to lower trailer feet. The invention allows a trucker to use manual effort or to use power to raise or to lower trailer feet.

There has thus been outlined, rather broadly, the more important features of the invention in order that the detailed description thereof that follows may be better understood and that the present contribution to the art may be better appreciated. The invention also has a generally rectangular slot, a slot with a widened end, an aperture in the pipe, welded connection of body to pipe, beveled flanges on the bracket, and additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a pivoting drive socket that operates on external power or on manual effort.

Another object is to provide such a pivoting drive socket that connects with existing trailer feet mechanisms.

Another object is to provide such a pivoting drive socket that reduces trucker occupational injuries and downtime.

Another object is to provide such a pivoting drive socket that has a low cost of manufacturing so the purchasing truckers, operators, lines, shops, suppliers, vendors, and warehouses can readily buy the pivoting drive socket through supply houses, catalogs, and select stores.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 8 is an end view of the body;
FIG. 9 is an end view opposite that of FIG. 8;
FIG. 10 is a perspective view of the bracket of the invention;
FIG. 11 is another perspective view of the bracket of the invention; and,
FIG. 12 is a side view of the handle of the invention.

The same reference numerals refer to the same parts throughout the various figures.

DESCRIPTION OF THE PREFERRED EMBODIMENT

The present invention overcomes the prior art limitations by providing a pivoting drive socket for truckers and the trucking industry. The invention allows a trucker to raise or to lower trailer feet using a powered wrench or alternatively using manual effort.

Figure 1:
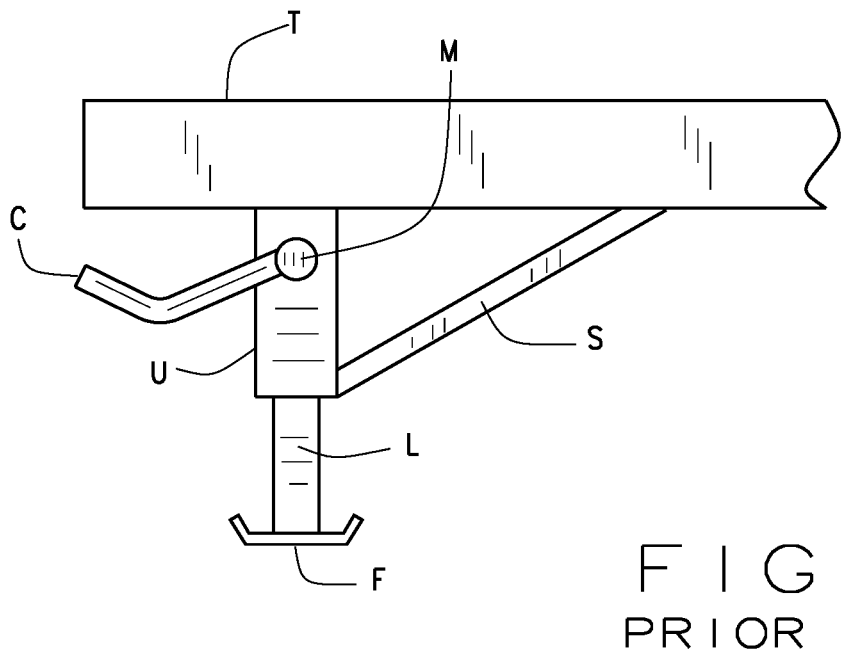
FIG. 1 is a side view of prior art.

Turning to FIG. 1, a portion of a prior art trailer T appears generally near the tongue that connects with a tractor or other prime mover. The trailer generally has an elongated flat form and its leading portion supported by feet F. The feet extend from legs L that descend and elevate through an upper leg U. The upper leg includes a geared mechanism M for raising and for lowering the legs L. A crank C operatively connects with the mechanism M so that a trucker may manually operate the feet F. For stiffness, a strut S extends from the trailer downwardly to the lower portion of the upper leg U. The strut supports the upper leg against a lateral load. Who turns the crank and how fast the feet raise or lower becomes a key part of turning a trailer from its loading or unloading phase to its revenue generating transport phase.

Figure 2:
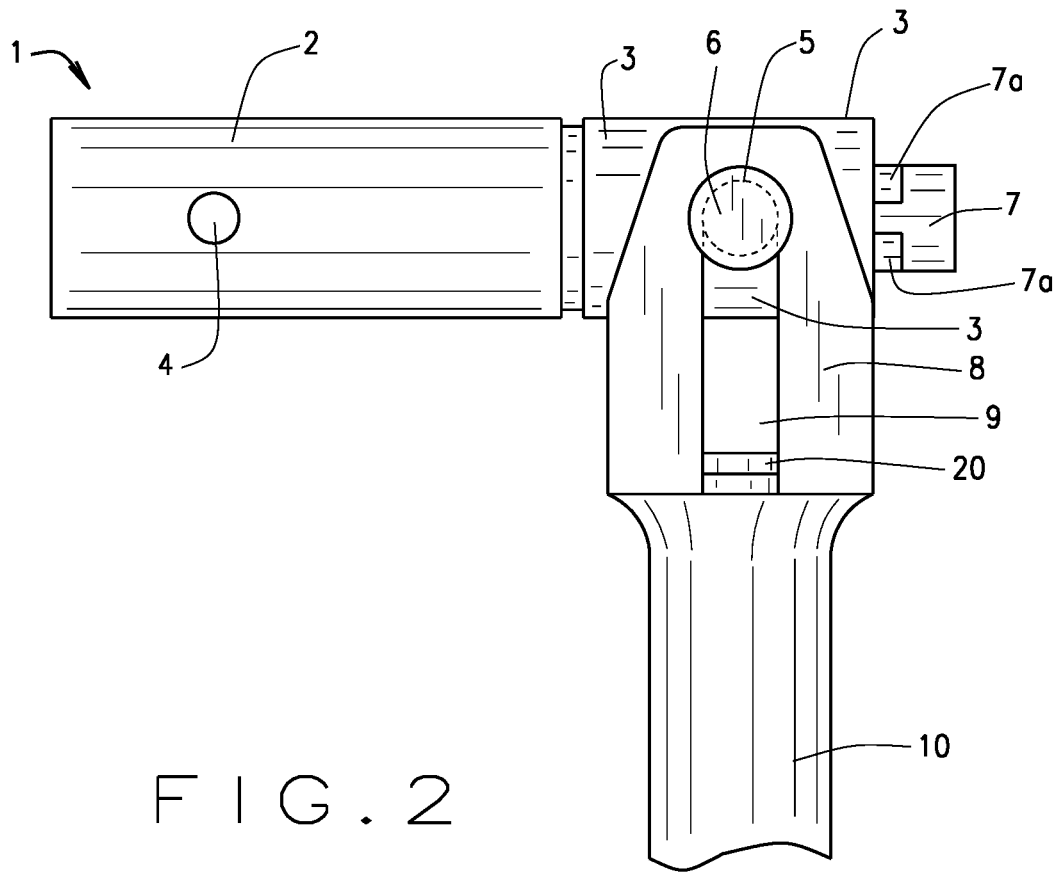
FIG. 2 is a side view of the present invention.

The pivoting drive socket of the present invention appears as at 1 in FIG. 2 in a side view. The invention 1 has a pipe 2 towards the left of this figure. The pipe has a round, hollow, elongated cylindrical form. The length of the pipe exceeds its diameter by at least a factor of two. The pipe has a wall formed into a hollow cylinder as its structure. Upon the pipe proximate an end towards the left of the figure, an aperture 4 penetrates the wall here in the foreground and across the diameter of the pipe in the background also. The apertures in the foreground and the background are coaxial and admit a pin or other means to connect the pipe to a fitting of an existing mechanism M for a trailer leg lift.

The pipe abuts a sleeve 3 generally of similar diameter and coaxial. The sleeve has a round, hollow shape and its length that exceeds its diameter but less than the length of the pipe. The pipe also has a wall formed into its hollow shape. The wall has two studs 5 joined to it that extend mutually outwardly. The studs extend coaxially upon a common diameter. The studs each have a diameter generally larger than that of the apertures 4 but less than that of the sleeve. Each stud has a cap 6 upon it of larger diameter than the stud itself and outwardly from the sleeve.

The pipe and the sleeve cooperatively receive a body, later shown in FIG. 7. The sleeve is coaxial with the body. Here in FIG. 2, the body has its tab 7 extending outwardly and axially from the sleeve 3 and opposite the pipe 2 and the sleeve. The tab has its length coaxial with the body, towards the right of this figure, generally less than that of the sleeve. The tab has a shape suitable for receiving a tool for powered usage of the invention. The body joins to the pipe opposite the tab. Near the sleeve, the tab has its two spaced apart chamfers 7a. The chamfers have an apparent rectangular shape the provide a gripping surface used by other components of the invention as later described. Opposite the tab, the body joins, or operatively connects, to the pipe while still rotating within the sleeve.

The studs 5 of the invention fit into slots 9 upon a bracket 8 as shown. The caps 6 retain the studs in the bracket and thus prevent inadvertent disassembly of the invention. The slots of the bracket have an elongated shape that widens into a truncated semi-elliptical form outwardly from the stud, that is, away from the sleeve. Here, the slot widens at least 25% from its width along the remainder of its length. In an alternate embodiment later shown, the slot has a constant width. The slots operate as a component of the bracket 8 that joins to a handle 10. The handle has a hollow, elongated form with an open end proximate the bracket. Upon the open end, the handle has a ring 20 joined thereto as reinforcement to the open end and the bracket. The open end of the handle admits a portion of the tab into it and within the ring. The tab engages with a socket upon the handle so that the handle grips the tab and imparts rotation and moment to the tab and thus turns the body and then the pipe. The handle and the bracket pivot upon the studs 5 of the sleeve so that the handle may impart rotation and moment to the tab by the manual effort of the trucker, or user, or the handle and the bracket rotate so that the handle disengages from the tab as a power source may turn the tab under greater rotation and moment than a trucker may impart.

Figure 3:
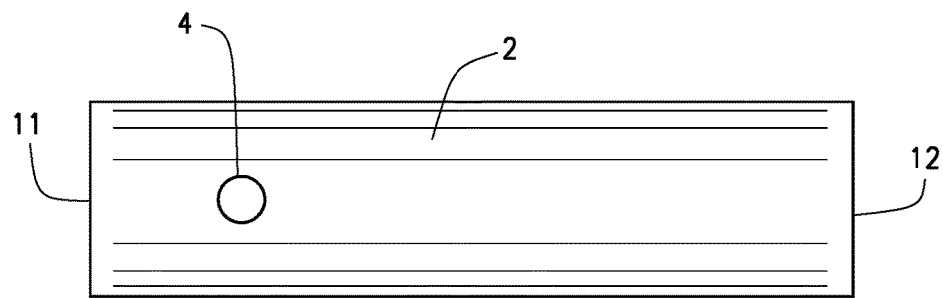
FIG. 3 is a side view of the pipe of the invention.

Turning to the components of the invention, FIG. 3 shows a side view of the pipe 2. The pipe has its hollow, elongated cylindrical form and a first end 11 and an opposite second end 12. The apertures 4 are proximate the first end. The first end has a generally outwardly location from the studs in the assembled invention. The second end positions towards the interior, or pivoting portion, of the invention when assembled.

Figure 4:
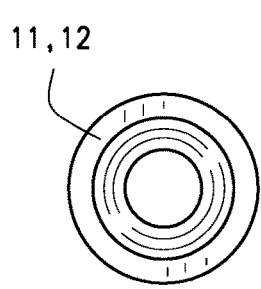
FIG. 4 is an end view of the pipe.

FIG. 4 shows an end view of the pipe either from the first end 11 or the second end 12. The pipe has a round form with an outer diameter, a thickness of the wall, and an inner diameter. The pipe has a hollow construction through out its length. Other than the location of the apertures, the pipe is generally symmetric, slender, and elongated.

Figure 5:
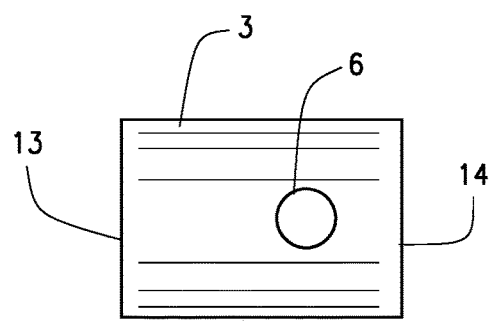
FIG. 5 is a side view of the sleeve of the invention.

Inwardly from the second end 12 of the pipe, the invention has the sleeve 3 here shown in a side view in FIG. 5. The sleeve too has a hollow cylindrical construction but of lesser length than the pipe. The sleeve has a slender, elongated, round form of slightly greater diameter than the pipe. The sleeve has a first end 13 here shown towards the left and an opposite second end 14. The sleeve has its studs with their caps 6 outwardly upon them. The caps, and their studs, have a location more towards the second end 14. The first end 13 of the sleeve 3 abuts the second end 12 of the pipe 2 in the assembled invention.

Figure 6:
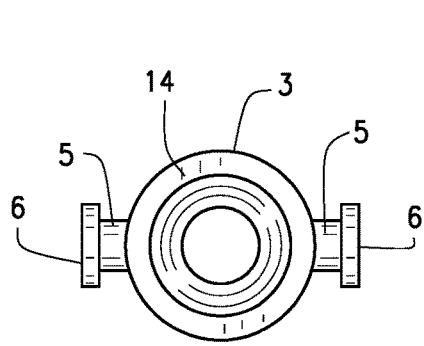
FIG. 6 is an end view of the sleeve.

Then FIG. 6 provides an end view of the sleeve with its second end 14 in the foreground. The sleeve 3 has its hollow construction with an outer diameter, a wall with a thickness, and an inner diameter. The sleeve also has a hollow construction through its length. Other than the location of the caps on the studs, the pipe is generally symmetric.

Figure 7:
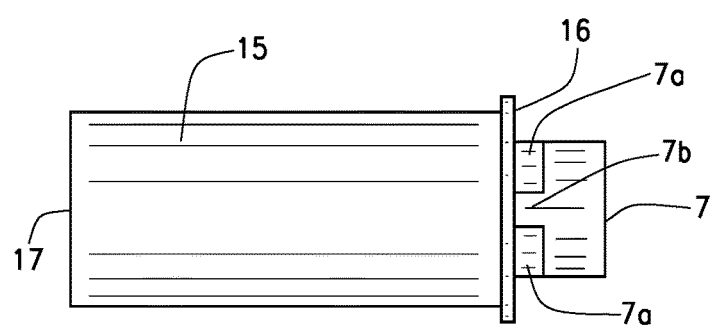
FIG. 7 is a side view of the body of the invention.

As previously described, the sleeve receives the body 15 within it and the body appears in a side view in FIG. 7. The body extends through the sleeve and rotates within it. The body is generally a solid cylinder and has a length more than its diameter and more than that of the sleeve but less than the length of the pipe. The body has a first end 17 here shown to the left or towards the pipe and an opposite shoulder 16. The shoulder has a slightly larger diameter than the remainder of the body and thus more width than the first end. The shoulder abuts the second end 14 of the sleeve as shown in FIG. 2. Extending outwardly from the shoulder, the body has its tab 7. The tab has a shape to fit into a socket from a power tool, such as an air wrench and a length coaxial with the body and less than the body. The shape appears later shown in FIG. 9. The tab has its maximum width less than that of the diameter of the shoulder and of the body while the tab remains coaxial with the body. The tab has its two chamfers 7a, in this view, generally extending along the diameter of the shoulder and adjoining the shoulder. The chamfers extend for less than the width of the tab, leaving a flat section 7b of the tab. The chamfers appear as chords partially across the tab. This figure shows the full width of the chamfers and their generally rectangular shape. The chamfers have a length less than that of the tab.

Figure 7A:
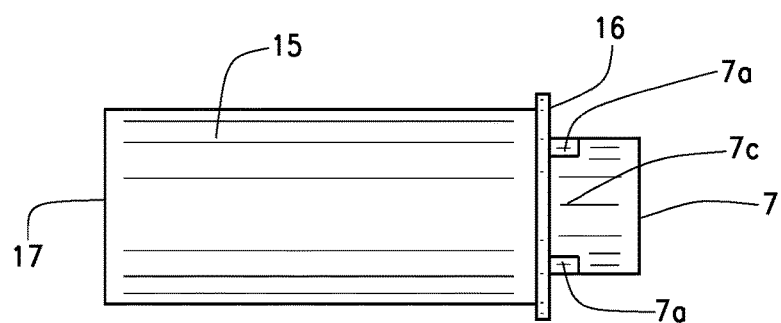
FIG. 7a is a side view of the body of the invention.

Rotating the body ninety degrees from the previous figure, FIG. 7a shows the body 15, its first end 17, and its shoulder 16. Outside of the shoulder, the tab 7 appears with its two chamfers 7a adjoining the shoulder. The chamfers extend for much less than the width of the tab, leaving a rounded section 7c of the tab. This figure shows the minimum width of the chamfers and their generally rectangular shape, viewed nearly on end. The rounded sections connect, or span, between the flat sections.

FIG. 8 is an end view of the body with the first end 17 in the foreground. The body has a generally solid construction and the first end shows a face of that solid material. The first end generally has a flat surface perpendicular to the length of the body.

Then opposite FIG. 8, FIG. 9 shows another end view of the body 15 with the tab 7 extending out of the plane of the figure. The body has the shoulder 16 extending beyond its diameter and the shoulder extends around the perimeter of this end of the body, the shoulder is round. Generally centered upon the shoulder 16, the tab 7 extends outwardly. The tab has its shape suitable for a socket of a power tool and also for a socket, a slot in the bracket as later shown or the handle as inferred, or a wrench. The tab has a somewhat rectangular form with two spaced apart, mutually parallel long sides, here shown upright, and with two lateral sides here shown rounded with a radius of curvature similar to the radius of the shoulder. The flat, long sides receive the jaws of a wrench or fit into a socket or a slot. In other words, the tab has an oval shape truncated by two mutually parallel and spaced apart planes. The four chamfers 7a appear in broken line as they adjoin the shoulder into the plane of this figure.

Mutually inward from the chamfers, the tab has its flat sections 7a that follow the flat surfaces of the remainder of the tab.

This invention permits a user to drive the tab and turn a trailer leg mechanism manually or powered. The bracket 8 plays a keep role for delivering power to the tab. The bracket appears in one partially exploded view in FIG. 10. The bracket has a U shaped form with two mutually parallel and spaced apart flanges 30 upon a base with an opening 31. The flanges each have an elongated slot 9' with rounded ends. The slot 9' extends for nearly the length of the flange. A stud 5 travels in each slot as previously shown in FIG. 2. The flanges have a width greatest, towards the base, that is, the right in this figure, and narrowest, outwardly from the base, that is, the left of this figure. The flanges end in a flat tip as shown. The opening, partially shown here, has a shape compatible with that of the tab previously shown. Proximate the opening 31 when assembled, the bracket has the ring 20. The ring has an inner diameter that of the diameter of the tab 7. The ring has a thickness at least one quarter that of the bracket.

Turning the bracket, FIG. 11 has a base 32 of the bracket towards the foreground. The base forms the bottom of the U shape and is generally perpendicular to the flanges. The base has the opening 31 that matches the shape of the tab. Placing the opening upon the tab engages the bracket to the body so a trucker may turn the body manually. Sliding the bracket outwardly from the sleeve disengages the bracket from the tab so a power tool may rotate it. The slots 9' in the flanges allow the studs upon the sleeve to travel along them. This figure also illustrates one method of making the bracket where a single piece of material has the slots 9' and the opening 31 cut or incised and then the material is folded or stamped into a U like shape. Further, the ring 20 has a coaxial orientation with the opening 31 and the inner diameter of the ring aligns with that of the diameter of the tab 7. The ring provides communication through itself to the opening. The ring reinforces the base 32 of the bracket 30 as the user inserts and removes the tab into the opening during the useful life of the invention. Also, upon a user inserting the tab 7 into the opening 31, at least one chamfer 7a grips the base 32—typically upon an edge- and the ring 20. This occurs when a user grasps the handle for usage and slightly turns the bracket. The grip of at least one chamfer prevents the tab from slipping out of the handle, the base, and the bracket when a user applies manually effort to the handle. During usage, the Applicant foresees two diametrically opposed chamfers gripping the base and the ring. The four chamfers provide for gripping whether the user rotates the handle clockwise or counterclockwise.

And, FIG. 12 shows the bracket 8 joined to a handle 10. The bracket shows its U like shape with the two flanges 30 having a mutually parallel and spaced apart orientation and the base 32 joining to both flanges. The ring 20 joins to the base 32, generally centered. The base has its opening 31 generally centered upon an end of the handle. The base has a greater width than the diameter, or width, of the handle. The handle joins to the bracket's base opposite the ring as shown. The handle has a length suitable for grasping by a trucker when manually turning the tab. During usage, a trucker places the opening upon the tab, the tab engages the bracket, and the tab extends slightly into the handle. This serves as the manual position of the pivoting drive socket. The handle has at least a portion of its length as hollow. With the tab engaged into the opening 31, a trucker then turns the handle 10 with the trucker's own effort. When the trucker desires powered turning of the leg mechanism, the trucker slides the bracket outwardly from the sleeve and disengages the bracket from the tab. That is the flat portions and the curved portions of the tab pass through the opening upon removing the tab from the bracket. This serves as the powered position of the invention. The tab then turns freely as the bracket hangs down from the studs of the sleeve. The handle has a position generally outwardly from the body, that is, perpendicular, and out of the way for application of a power tool to the tab. The bracket permits the handle to rotate beneath the tab and the U shape allows a power tool free access to the tab between the flanges.

From the aforementioned description, a pivoting drive socket has been described. The pivoting drive socket is uniquely capable of transitioning between manual and powered turning of a tab that engages a trailer leg lift mechanism. Further, the pivoting drive socket may also have a handle that engages the tab for manual use, various slot shapes, and other related features compatible with the structure and purpose of the invention as shown and described. The pivoting drive socket and its various components may be manufactured from many materials, including but not limited to, ferrous and non-ferrous metal foils, their alloys, composites, polymers, such as nylon, polypropylene, polyvinyl chloride, high density polyethylene, polypropylene, and other materials.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device to transmit power to a trailer leg lift, comprising:
   a pipe;
   a sleeve coaxial with said pipe;
   a body operatively connected to said pipe, said body rotating within said sleeve, said body having a tab extending axially therefrom opposite said pipe;
   a bracket pivotally connecting to said sleeve;
   a handle joining said bracket into a continuous unit;
   wherein said handle rotates said bracket so that said handle directly engages said tab for manual delivery of power to said device by a user or said handle rotates said bracket so that said handle disengages from said tab for mechanical delivery of power to said device;
   said sleeve having a hollow cylindrical construction, two coaxial studs diametrically opposite, a first end and an opposite second end, said studs locating proximate said second end, said first end locating towards said pipe, each of said studs having a cap thereon outwardly from said sleeve;
   said bracket having a U shape with two mutually parallel and spaced apart flanges and a base joining to said flanges, each of said flanges have a slot therein, said studs travelling within said slots, said base having an opening shaped to admit said tab therethrough, and a round ring centered upon and joined to said base entirely within said flanges, said round ring providing communication through said opening, the joining of said round ring to said base reinforces said base proximate said opening.

2. A device for a trailer leg lift comprising:
   a tab, said tab having a length;
   a handle operatively connecting to said tab;
   said tab extending axially from a solid body;
   a sleeve coaxial with said body opposite said tab, said body rotating within said sleeve;
   said body joining to a pipe outwardly from said sleeve and opposite said tab;
   a bracket pivotally connecting to said sleeve and said handle joining to said bracket;
   wherein said handle rotates said bracket firstly so that said handle directly engages said tab for manual delivery of power to said device by a user and said handle rotates said bracket secondly so that said handle disengages from said tab for mechanical delivery of power to said device;
   said tab having two mutually parallel and spaced apart flat sections and two curved sections connecting to said flat sections;
   said tab having four mutually spaced apart chamfers, two in each of said flat sections, said chamfers having a length less than that of said tab;
   wherein said tab is adapted to be grasped by a wrench;
   said body having a cylindrical form, a first end and an opposite shoulder, said shoulder being wider than said first end;
   said body extending through said sleeve, said shoulder abutting said second end of said sleeve;

said tab being coaxial with said body, said length of said tab being coaxial with said body, and said tab extending outwardly from said shoulder;

said chamfers adjoining said shoulder;

said sleeve having a hollow cylindrical construction, two coaxial studs diametrically opposite, a first end and an opposite second end, said first end locating towards said pipe, said studs locating proximate said second end, and each of said studs having a cap thereon outwardly from said sleeve;

said bracket having a U shape with two mutually parallel and spaced apart flanges and a base joining to said flanges, each of said flanges have a slot therein, said studs travelling within said slots, said base having an opening shaped to receive said tab therein, and a round ring centered upon and joined to said base entirely within said flanges, said round ring providing communication through said opening, the joining of said round ring to said base reinforces said base proximate said opening;

said handle joining said base into a continuous unit and said handle joining to said base of said bracket opposite said round ring and receiving said tab.

3. The device for a trailer leg lift of claim 2 further comprising:

said pipe being slender, elongated, round, and hollow, having a first end and an opposite second end;

an aperture extending through said pipe upon a diameter and proximate said first end;

said second end of said pipe joining to said body opposite said shoulder; and, wherein said aperture is adapted to engage the trailer leg lift.

4. The device for a trailer leg lift of claim 2 wherein at least one of said chamfers grips said base and said round ring upon insertion of said tab into said opening of said bracket and into said handle during manual delivery of power to said device by a user and wherein said flat sections of said tab and said curved sections of said tab pass through said opening upon removal of said tab from said bracket thus disengaging said handle from said tab for mechanical delivery of power to said tab.

5. A pivoting socket, comprising:

a pipe, said pipe being slender, elongated, round, and hollow, having a first end and an opposite second end, an aperture extending through said pipe upon a diameter and proximate said first end, and, wherein said aperture is adapted to engage a trailer leg lift;

a sleeve coaxial with said pipe, said sleeve having a hollow cylindrical construction from a wall, two coaxial studs diametrically opposite, a first end and an opposite second end, said studs locating proximate said second end, said first end locating towards said pipe, each of said studs having a cap thereon outwardly from said wall;

a body operatively connected to said pipe, said body rotating within said sleeve, said body having a tab extending axially therefrom opposite said pipe, said body having a solid cylindrical form, a first end and an opposite shoulder, said shoulder being wider than said first end, said tab having a length coaxial with said body, and said tab extending outwardly from said shoulder, said body extending through said sleeve, said shoulder abutting said second end of said sleeve, and said tab being coaxial with said shoulder and said body;

a bracket pivotally connecting to said sleeve, said bracket having a U shape with two mutually parallel and spaced apart flanges and a base joining to said flanges, each of said flanges have a slot therein, said studs travel within said slots, said base having an opening therein generally round and admitting said tab therethrough, and a round ring centered upon and joined to said base entirely within said flanges, said round ring providing communication through said opening, the joining of said round ring to said base reinforces said base proximate said opening;

a handle to joining said bracket into a continuous unit and said handle joining said bracket upon said base opposite said round ring;

wherein said tab is adapted to be grasped by a wrench; and, wherein said handle rotates said bracket so that said handle directly engages said tab for manual delivery of power to said device by a user or said handle rotates said bracket so that said handle disengages from said tab for mechanical delivery of power to said device.

6. The pivoting socket of claim 5, further comprising:

said tab having two mutually parallel and spaced apart flat sections and two curved sections connecting to said flat sections;

said tab having four mutually spaced apart chamfers, two in each of said flat sections, said chamfers being proximate said shoulder, and said chamfers having a length less than that of said tab.

* * * * *